US008150723B2

(12) United States Patent
Chen et al.

(10) Patent No.: US 8,150,723 B2
(45) Date of Patent: Apr. 3, 2012

(54) LARGE-SCALE BEHAVIORAL TARGETING FOR ADVERTISING OVER A NETWORK

(75) Inventors: Ye Chen, Sunnyvale, CA (US); Dmitry Pavlov, San Jose, CA (US); Pavel Berkhin, Sunnyvale, CA (US); John Canny, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 537 days.

(21) Appl. No.: 12/351,749

(22) Filed: Jan. 9, 2009

(65) Prior Publication Data

US 2010/0179855 A1    Jul. 15, 2010

(51) Int. Cl.
*G06Q 10/00* (2006.01)
*G06Q 30/00* (2006.01)

(52) U.S. Cl. ............ 705/7.29; 705/7.11; 705/7.31; 705/7.35; 705/7.36; 705/7.38

(58) Field of Classification Search .......... 705/7.29
See application file for complete search history.

(56) References Cited

U.S. PATENT DOCUMENTS

| | | | | |
|---|---|---|---|---|
| 6,549,919 B2* | 4/2003 | Lambert et al. | ............. | 707/695 |
| 6,826,568 B2* | 11/2004 | Bernstein et al. | ............. | 707/749 |
| 7,065,618 B1* | 6/2006 | Ghemawat et al. | ............. | 711/161 |
| 7,716,225 B1* | 5/2010 | Dean et al. | ............. | 707/748 |
| 2003/0028502 A1* | 2/2003 | Lambert et al. | ............. | 707/1 |
| 2003/0101449 A1* | 5/2003 | Bentolila et al. | ............. | 725/10 |
| 2003/0120651 A1* | 6/2003 | Bernstein et al. | ............. | 707/6 |
| 2005/0288962 A1* | 12/2005 | Boyd et al. | ............. | 705/1 |
| 2006/0004598 A1* | 1/2006 | Boyd et al. | ............. | 705/1 |
| 2008/0098370 A1* | 4/2008 | Fontoura et al. | ............. | 717/139 |
| 2008/0222093 A1* | 9/2008 | Fan et al. | ............. | 707/2 |
| 2010/0161385 A1* | 6/2010 | Karypis et al. | ............. | 705/10 |

OTHER PUBLICATIONS

Shirom, Arie; Rosenblatt, Zehava; "A panel study of the effects of school positions and promotions on absenteeism in the teaching profession"; Journal of Occupational and Organizational Psychology , 79 , 4 , 623(22), Dec. 2006.*
Boatwright, Peter; Borle, Sharad; Kadane, Joseph B.; "A model of the joint distribution of purchase quantity and timing"; Journal of the American Statistical Association , 98 , 463 , 564(9); Sep. 2003.*
Christensen, Timothy; Hurn, Stan; Lindsay, Kenneth; "It never rains but it pours: modeling the persistence of spikes in electricity prices"; Energy Journal , 30 , 1 , 25(24); Jan. 2009.*

* cited by examiner

*Primary Examiner* — Nga B Nguyen
*Assistant Examiner* — Leland Marcus
(74) *Attorney, Agent, or Firm* — Stattker-Suh PC

(57) ABSTRACT

A method and a system are provided for large-scale behavioral targeting for advertising over a network, such as the Internet. In one example, the system receives training data that is processed raw data of user behavior. The system generates selected features by performing feature selection on the training data. The system generates feature vectors from the selected features. The system initializes weights of a behavioral targeting model by scanning the feature vectors once. The system then updates the weights of the behavioral targeting model by scanning iteratively the feature vectors using a multiplicative recurrence.

15 Claims, 4 Drawing Sheets

LARGE-SCALE BEHAVIORAL TARGETING FOR ADVERTISING OVER A NETWORK

FIELD OF THE INVENTION

The invention relates to advertising over a network. More particularly, the invention relates to large-scale behavioral targeting for advertising over a network, such as the Internet.

BACKGROUND

Behavioral targeting is intrinsically a large-scale machine learning problem from the following perspectives. First, to fit a BT predictive model with low generalization error and a desired level of statistical confidence requires vast amounts of data; experiments have shown that the prediction accuracy increases monotonically as the data size increases up to the entire user data of Yahoo!®. Second, the dimensionality of feature space for BT model is very high, for example, ranging from several hundred thousand to several million. Third, the number of BT models to be built is large. For a company like Yahoo!®, there may be over 450 BT-category models for browser and login cookies (a.k.a., b-cookie and I-cookie, respectively) that need to be trained on a regular basis. Furthermore, the solution to training BT models has to be very efficient, because (1) user interests and behavioral patterns change over time and (2) cookies and features (e.g., ads and pages) are volatile objects. Fourth, scientific experimentation and technical breakthrough in BT requires a scalable and flexible platform to enable a high speed of innovation.

SUMMARY

What is needed is an improved method having features for addressing the problems mentioned above and new features not yet discussed. Broadly speaking, the invention meets these needs by providing a method and a system for large-scale behavioral targeting for advertising over a network, such as the Internet. It should be appreciated that the invention can be implemented in numerous ways, including as a method, a process, an apparatus, a system or a device. Inventive embodiments of the invention are summarized below.

In one embodiment, a method is provided for large-scale behavioral targeting. The method comprises receiving training data that is processed raw data of user behavior, generating selected features by performing feature selection on the training data, generating feature vectors from the selected features, initializing weights of a behavioral targeting model by scanning the feature vectors once, and updating the weights of the behavioral targeting model by scanning iteratively the feature vectors using a multiplicative recurrence.

In another embodiment, a system is provided for large-scale behavioral targeting. The system is configured for receiving training data that is processed raw data of user behavior, generating selected features by performing feature selection on the training data, generating feature vectors from the selected features, initializing weights of a behavioral targeting model by scanning the feature vectors once, and updating the weights of the behavioral targeting model by scanning iteratively the feature vectors using a multiplicative recurrence.

In still another embodiment, a computer readable medium carrying one or more instructions for large-scale behavioral targeting is provided. The one or more instructions, when executed by one or more processors, cause the one or more processors to perform the steps of receiving training data, generating selected features by performing feature selection on the training data, generating feature vectors from the selected features, initializing weights of a behavioral targeting model by scanning the feature vectors once, and updating the weights of the behavioral targeting model by scanning iteratively the feature vectors using a multiplicative recurrence.

The invention encompasses other embodiments configured as set forth above and with other features and alternatives.

BRIEF DESCRIPTION OF THE DRAWINGS

The invention will be readily understood by the following detailed description in conjunction with the accompanying drawings. To facilitate this description, like reference numerals designate like structural elements.

DETAILED DESCRIPTION

Figure 1:
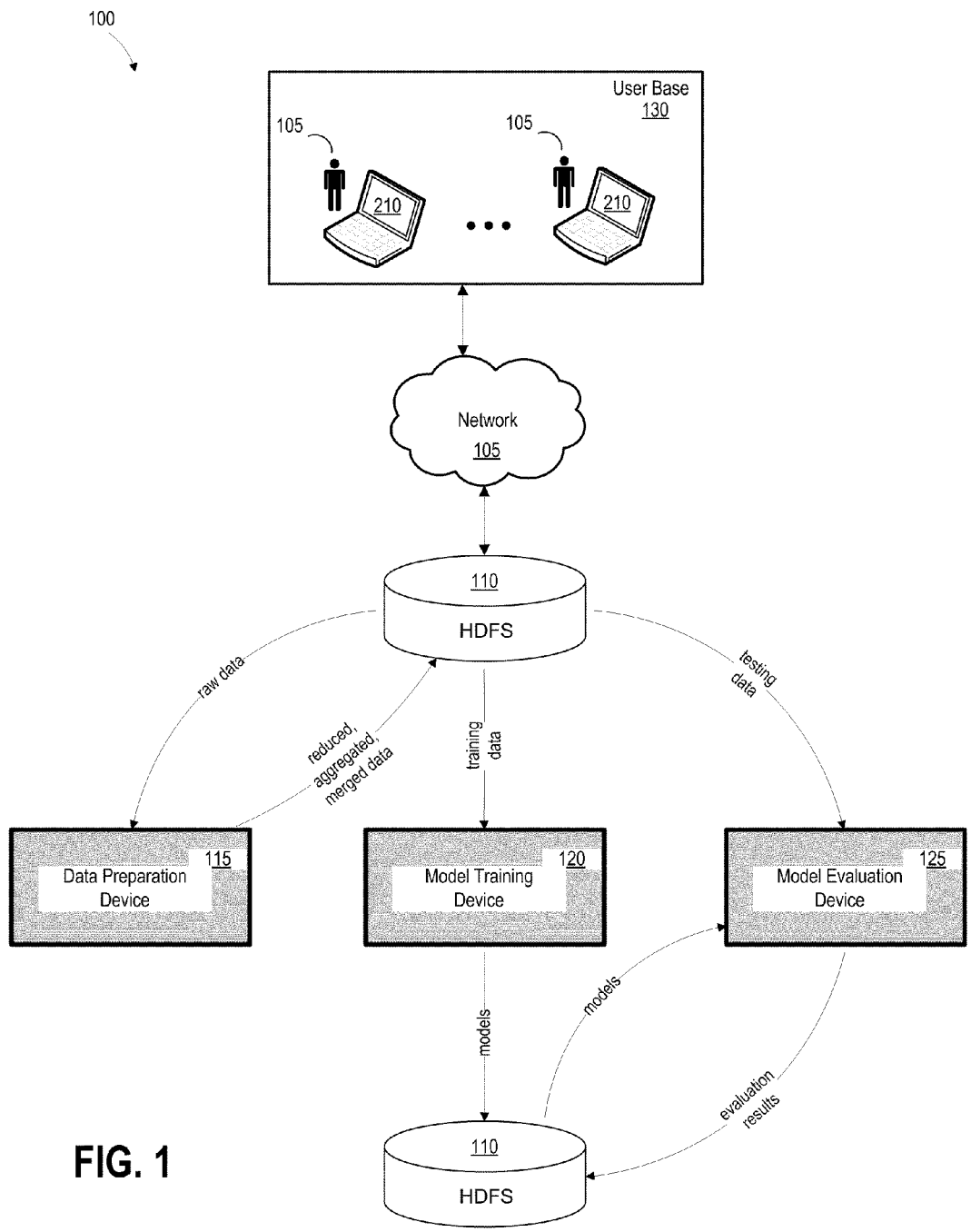
FIG. 1 is a block diagram of a system for large-scale behavioral targeting for advertising over a network, in accordance with some embodiments.

An invention is disclosed for large-scale behavioral targeting for advertising over a network, such as the Internet. Numerous specific details are set forth in order to provide a thorough understanding of the invention. It will be understood, however, to one skilled in the art, that the invention may be practiced with other specific details.

Section 1

Definitions

Some terms are defined below for clarity purposes. These terms are not rigidly restricted to these definitions. These terms and other terms may also be defined by their use in the context of this description.

"Computer" (i.e., "user computer" or "client" or "server") may refer to a single computer or to a system of interacting computers. A computer is a combination of a hardware system, a software operating system and perhaps one or more software application programs. Examples of a computer include without limitation a laptop computer, a palmtop computer, a smart phone, a cell phone, a mobile phone, an IBM-type personal computer (PC) having an operating system such as Microsoft Windows®, an Apple® computer having an operating system such as MAC-OS, hardware having a JAVA-OS operating system, and a Sun Microsystems Workstation having a UNIX operating system.

"Device" means hardware, software or a combination thereof. A device may sometimes be referred to as an apparatus. Each device is configured to carry out one or more steps of the method for large-scale behavioral targeting.

"Hadoop" is a free Java software framework developed by Apache Software Foundation that supports data intensive distributed applications. Hadoop enables applications to work with thousands of nodes and petabytes of data. Hadoop was inspired by Google®'s MapReduce and Google File System (GFS) papers. Hadoop is a top level Apache project, being built and used by a community of contributors from all over the world. Yahoo!® has been the largest contributor to the project and uses Hadoop extensively in its Web Search and Advertising businesses.

"Network" means any combination of electronic networks, including without limitation the Internet, a local area network, a wide area network, a wireless network and a cellular network.

For implementations of the present system, a software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, CGI, Java and Java Scripts. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in Section 7 below.

Section 2

General Overview

Behavioral targeting (BT) leverages historical user behavior to select the most relevant ads to display. Embodiments of this invention derive a linear Poisson regression model from web-scale user behavioral data and predicts click-through rate (CTR) from user history. The system is a highly scalable and efficient solution to BT using the Hadoop MapReduce framework. The parallelized algorithm and the resulting system is configured to build above 450 BT-category models from the entire user base of a company like Yahoo!® within one day, a scale that one could not even imagine with conventional systems. Besides the scalability and efficiency, the system has been shown to yield 20% CTR lift over a conventional production system by leveraging a well-grounded probabilistic model fitted from a much larger training dataset.

Specifically, the system is configured to provide mainly the following: (1) a MapReduce statistical learning algorithm and implementation that achieve optimal data parallelism, task parallelism, and load balance in spite of typically skewed distribution of domain data; (2) a MapReduce feature vector generation algorithm and implementation with linear time complexity O(n) regardless of the granularity of sliding target window; (3) an in-memory caching scheme that significantly reduces the number of disk inputs and outputs (IOs) to make large-scale learning practical; and (4) highly efficient data structures and sparse representations of models and data to enable efficient model updating. The system makes significant contributions to solving large-scale machine learning problems of industrial relevance in general.

The sections below describe the distributed algorithms of fitting a linear Poisson regression model using a Hadoop MapReduce framework. The focus, however, is to elaborate on various innovations to address practical issues in large-scale learning.

FIG. 1 is a block diagram of a system 100 for large-scale behavioral targeting for advertising over a network, in accordance with some embodiments. The architecture contains three main components: a data preparation device 115, a model training device 120, and model evaluation device 125. A network 105 couples together a user base 130 and a Hadoop distributed file system (HDFS) 110. The user base 130 includes user computers 210 operated by users 105. The HDFS 110 is coupled to the data preparation device 115, the model training device 120, and the model evaluation device 125. The HDFS 110 is conceptually split into two parts to clarify the schematics of the system 100.

Section 3

Data Preparation

Referring to FIG. 1, data preparation in the data preparation device 110 is a preprocessing step to extract the data fields of interest from raw data feeds, thus reducing the size of data. The raw data (i.e., raw behavior data) originally comes from the user base 130. The system 100 stores the raw data in the HDFS 110 and sends the raw data to the data preparation device. Raw data is data related to user behavior with respect to one or more ads. Raw data may include, for example, ad clicks, ad views, page views, searches, organic clicks, and/or overture clicks.

A lot of raw data may be irrelevant. The data preparation device 110 aggregates event counts over a configurable period of time to further shrink the data size, while satisfying the time granularity required for model training and evaluation (e.g., one second for short term, or one-minute for long term). Another data reduction happens from merging counts into a single entry with <cookie, timeperiod> as unique key. This step contains two MapReduce jobs: FeatureExtractor and FeatureGenerator. For an example of a FeatureExtractor algorithm, see Algorithm 1 below. For an example of a FeatureGenerator algorithm, see Algorithm 2 below.

---

Algorithm 1: FeatureExtractor

/* Throughout this presentation, we denote a datum in
   MapReduce framework as ⟨key, value⟩, use ':' as field
   delimiter within key or value, and '...' for
   repetition of foregoing fields.                    */
Input: raw data feeds
Output: ⟨cookie:timePeriod:featureType:featureName,
         featureCount⟩
Mapper → ⟨cookie:timePeriod:featureType:featureName, 1⟩;
Partitioner: by hash code of the first-half of a cookie string;
Combiner: ValueAggregatorCombiner (aggregate values over a key mapper-locally);
Reducer: ValueAggregatorReducer (aggregate values over a key);

---

Algorithm 2: FeatureGenerator

Input: ⟨cookie:timePeriod:featureType:featureName, featureCount⟩
Output: ⟨cookie:timePeriod,
         featureType:featureName:featureCount...⟩
Mapper → ⟨cookie:timePeriod,
featureType:featureName:featureCount⟩;
Combiner: merge values into a single entry (mapper-local);
Reducer: merge values into a single entry;

---

The system 100 maximizes the reusability of preprocessed data and the flexibility of experimentation using the following techniques.

(1) The data preparation device 115 preprocesses raw data into dates and random partitions of cookies. Given a certain period of user history from which the system is configured to build a model, the data preparation device 115 may process the data into a single chunk eliminating timestamps. This design may have lower computing overhead for this single task, but preventing experimentation with different ranges of user history (e.g., one-month to two-month). Similarly, partitioning cookies randomly into small subsets provides a sampling scheme naturally.

(2) The data preparation device 115, by design, is simple and minimizes information loss. Only data manipulations are extracting relevant fields and aggregating over <cookie, timeperiod>, based on the relatively stable data semantic time resolution requirements. In particular, there is no decay; thus facilitating experimenting with different decay factors.

(3) The data preparation device 115 uses <cookie, timePeriod> as key. This design reduces the data size comparing with tagging timestamp with individual events. The timePeriod is required for decaying later in modeling. Furthermore, using cookie and timePeriod as composite key reduces the length of an entry, thereby scaling to very long history user data and alleviating any restriction on the buffer size of a record.

(4) The data preparation device 115 does not categorize target features (ad clicks and views) to avoid redundancy while supporting modeling for different sets of categories and with different methods of generating training examples, e.g., causal and non-causal.

Section 4

Model Training

Referring to FIG. 1, model training in the model training device 115 fits a linear Poisson regression model from the preprocessed data. It involves feature selection, generation of training examples, model weights initialization, and multiplicative recurrence to converge model weights. Specifically, the model training device 115 contains four sequential sub-components: PoissonEntityDictionary (feature selection), PoissonFeatureVector (generation of training examples), PoissonIntializer (model weights initialization), and PoissonMultiplicative (multiplicative recurrence).

Section 4.1: PoissonEntityDictionary

The model training device 120 includes a PoissonEntityDictionary that mainly performs feature selection and inverted indexing. It does so by counting entity frequency in terms of touching cookies and selecting the most frequent entities in the given feature space. See, for example, Algorithm 3 below.

---
Algorithm 3: PoissonEntityDictionary
---

Input: (cookie:timePeriod,
　　　featureType:featureName:featureCount...)
Output: one hash map of (entityType:featureName,
　　　featureIndex)(inverted index) ∀ entityType
MapReduce 1: PoissonEntityUnit;
Mapper → (cookie, featureType:featureName:featureCount...);
Reducer → (entityType:featureName, 1) ∀ touching cookie;
MapReduce 2: PoissonEntitySum;
Mapper: IdentityMapper (routing inputs of a same cookie to a single reducer);

---
Algorithm 3: PoissonEntityDictionary
---

Combiner → (entityType:featureName, cookieCount) (mapper-local);
Reducer → (entityType:featureName, cookieCount);
MapReduce 3: PoissonEntityHash;
Mapper: InverseMapper (swap key and value);
Comparator: optimized for integer;
Partitioner: by entityType (routing entries with a same entityType to a single reducer);
Reducer: hash entities with frequency above threshold, and assign featureIndex values (inverted index), ∀ entityType;

Feature selection is not only theoretically sound, but also practically important; since for example the dimensionality of search queries can be unbounded. The linear Poisson regression model uses granular events (e.g., granular ad clicks and search queries) as features (regressors), with a dimensionality ranging from several hundred thousand to several million.

An entity refers to the name (unique identifier) of an event (e.g., an ad id, a space id for page, or a query). Entity is different from feature since the latter is uniquely identified by a <featureType, featureName> pair. For example, a same ad id may be used by an ad click feature or an ad view feature. Similarly, a same query term may denote a query feature, organic search result click or sponsored search click feature. In the context of BT, there are three types of entities: ad, page, and search. The PoissonEntityDictionary may include three MapReduce jobs: PoissonEntityUnit, PoissonEntitySum, PoissonEntityHash.

Several important design considerations are as follows:

(1) The model training device 120 counts frequency in cookie (i.e., touching cookie) instead of event. This indeed imposes a robot filtering mechanism by enforcing one vote for each cookie. Assuming that a robot cookie keeps "visiting" a Finance page for some stock quotes in a very high frequency, that page will not dominate the frequency table obtained by counting cookies.

(2) To build a hash map of most frequent entities of a type, the model training device 120 applies a predefined threshold (lower bound) instead of selecting top-N from a sorted frequency table. The threshold is probed a priori given a desired dimensionality of feature space. But once an optimal threshold is determined, it can be used consistently regardless of the size of the training data. The threshold approach is more statistically sound since more features (thus more model parameters) require more data to fit; and vice versa, more data favors more features in a more expressive model.

(3) With regard to the feature selection method, the model training device 120 simply uses frequency-based approach instead of other more sophisticated information-theoretic methods such as mutual information. This design is not only for computational efficiency, but also because, empirically, frequency-based feature selection works best for sparse data. Theoretically, this is partially because mutual information estimates can be very noisy in sparse data.

(4) The MapReduce framework enforces sorting on key for input to reducers, which is required for reducers to efficiently fetch relevant partitions. In many cases, however, the logic within the reducer does not need input to be sorted. Sorting some data type can be expensive (e.g., arbitrarily long string as cookies). To avoid this unnecessary overhead, an optimization is to swap key and value in the mapper device, given that (a) key data type is sorting-expensive, while value data type is not and that (b) swapping key and value does not compromise the data needs and computing cost in the reducer device. PoissonEntityHash is an example of where such an optimization is realized.

Section 4.2: PoissonFeatureVector

The model training device 120 includes a PoissonFeatureVector generates training examples (feature vectors) that will be directly used later by model initialization and multiplicative recurrence. (See Section 4.3 and Section 4.4, respectively.) For iterative algorithms of optimization commonly used for statistical machine learning, one needs to scan the training data multiple times. Even for a fast-convergent method such as the multiplicative recurrence in this case, the algorithm requires 15-20 passes of training data to converge the maximum likelihood estimators (MLE) of model parameters, as described in Section 4.4. Consequently, great efforts should be made to design a representation optimized for sequential access, along both the user and the feature dimensions, while materializing any data reduction and pre-computing opportunities.

Proper generation of feature vectors is even more crucial for large-scale problems such as BT. The system in this regard includes the following:

(1) A sparse data structure for feature vectors. Behavioral count data is very sparse by nature. For a given user in a certain time period, his or her activity only involves a limited number of events. The counts of most of the other features in a high-dimensional space are zeros. Specifically, the model training device 120 uses a pair of arrays of same length to represent a feature vector or a target vector; one of integer type for feature and the other of float type for value (float type for possible decaying) with an array index giving a <feature, value> pair. The model training device 120 further splits the representation for features and targets for fast access of either. See, for example, Algorithm 4 below.

(2) Feature selection and inverted indexing. With the feature space selected from PoissonEntityDictionary, in this step, the model training device 120 discards unselected events from the training data in the feature (input variable) side. In the target (response variable) side, it is an option to use all features or only selected features to categorize into target event counts. With the inverted index built from PoissonEntityDictionary, from the PoissonFeatureVector step and onwards, the model training device 120 references an original feature name by its index. The original feature name can be of any data type with arbitrary length; after indexing the algorithm now efficiently deals with integer index consistently. The same idea is also applied to cookies. In this step, the model training device 120 hashes cookies since, after feature vectors are generated, the cookie field is irrelevant.

(3) Several pre-computations are carried out in this step. First, model training device 120 further aggregates feature counts into a time window with a size larger or equal to the resolution from the data preparation device 110. Second, model training device 120 decays counts over time using a configurable factor. Third, model training device 120 realizes causal or non-causal approaches to generating examples. The causal approach collects features before targets temporally; while the non-causal approach generates targets and features from a same period of history. Although the causal method seems more intuitive and must be followed in evaluation, the non-causal way has advantages in increasing the effective data size for training and is more suitable for some short-term modeling techniques.

(4) The model training device 120 uses binary representation (serialized objects in Java) and data compression (SequenceFile with BLOCK compression in Hadoop framework) for feature vectors.

---

Algorithm 4: PoissonFeatureVector

Data structure: FeatureVector
begin
   /* Array notation: dataType [arrayLength]    */
   int[targetLength] targetIndex Array;
   float[targetLength] targetValueArray;
   int[inputLength] inputIndexArray;
   float[inputLength] inputValueArray;
end Input: ⟨cookie:timePeriod,
      featureType:featureName:featureCount...⟩

Output: ⟨cookieIndex, FeatureVector⟩
MapReduce 1: PoissonFeatureVector;

Mapper → ⟨cookie,
timePeriod:featureType:featureName:featureCount...⟩;

Reducer → ⟨cookieIndex, FeatureVector⟩;
begin
   /* For a cookie    */
   compute boundaries of W pairs of feature/target windows;
   cache events and sort values by timePeriod;
   initialize iterators and TreeMaps;
   /* Slide window forward    */
   for w = 1 to W do
      advance prevFeatureBegin to decrement feature counts;
      decay feature counts incrementally;
      advance currFeatureBegin to increment feature counts;
      advance currTargetBegin to increment target counts;
      robot filtering and stratified sampling;
      bookkeeping reducer-local total counts;
      output FeatureVector;
   end
end
MapReduce 2: PoissonFeatureExample;
Mapper: IdentityMapper;
Reducer: reducer-local example counts → global example count;
MapReduce 3: PoissonFeatureUnigram;
Mapper: IdentityMapper;
Reducer: reducer-local feature unigram counts → global feature unigram counts;
MapReduce 4: PoissonTargetUnigram;
Mapper: IdentityMapper;
Reducer: reducer-local target unigram counts → global target unigram counts;

---

It is generally intractable to use algorithms of time complexity higher than linear $O(n)$ in solving large-scale machine learning problems of industrial relevance. Moreover, unlike traditional complexity analysis, the scalar k of a linear complexity $O(kn)$ must be seriously accounted for when n is easily in the order of billion. BT is a problem of such scale. The goal here in runtime complexity is $O(1n)$. In generating examples in a casual manner, target counts are collected from a sliding time window and feature counts are aggregated (possibly with decay) from a time period preceding the target window. Recall that ad click is a very rare event, while it is a target event thus carrying arguably the most valuable information in predicting CTR. The size of a sliding target window should be relatively small for the following reasons. Empirically, a large window (e.g., one-week) effectively discards many <feature, target> co-occurrences within that window given that a typical user session lasts less than one hour. Theoretically, for a large window and hence large target event counts, the assumed Poisson can be approximated by a Gaussian with a same mean. But in prediction, one typically estimates target counts in a window of several minutes (time interval between successive ad servings). Empirically, the following setup yields superior long-term models: (a) a target window of size one-day, (b) sliding over a one-week period, (c) and preceded by a four-week feature window (also sliding along with the target window). Suppose the number of sliding windows is t, a naïve algorithm would scan the data t times and thus have a complexity of O(tn). When t increases, O(tn) becomes unacceptable. For example, per-minute sliding over one week for short-term models gives 10,080 windows. The system develops an algorithm of O(n) complexity, regardless of the number of sliding windows t.

Figure 2:
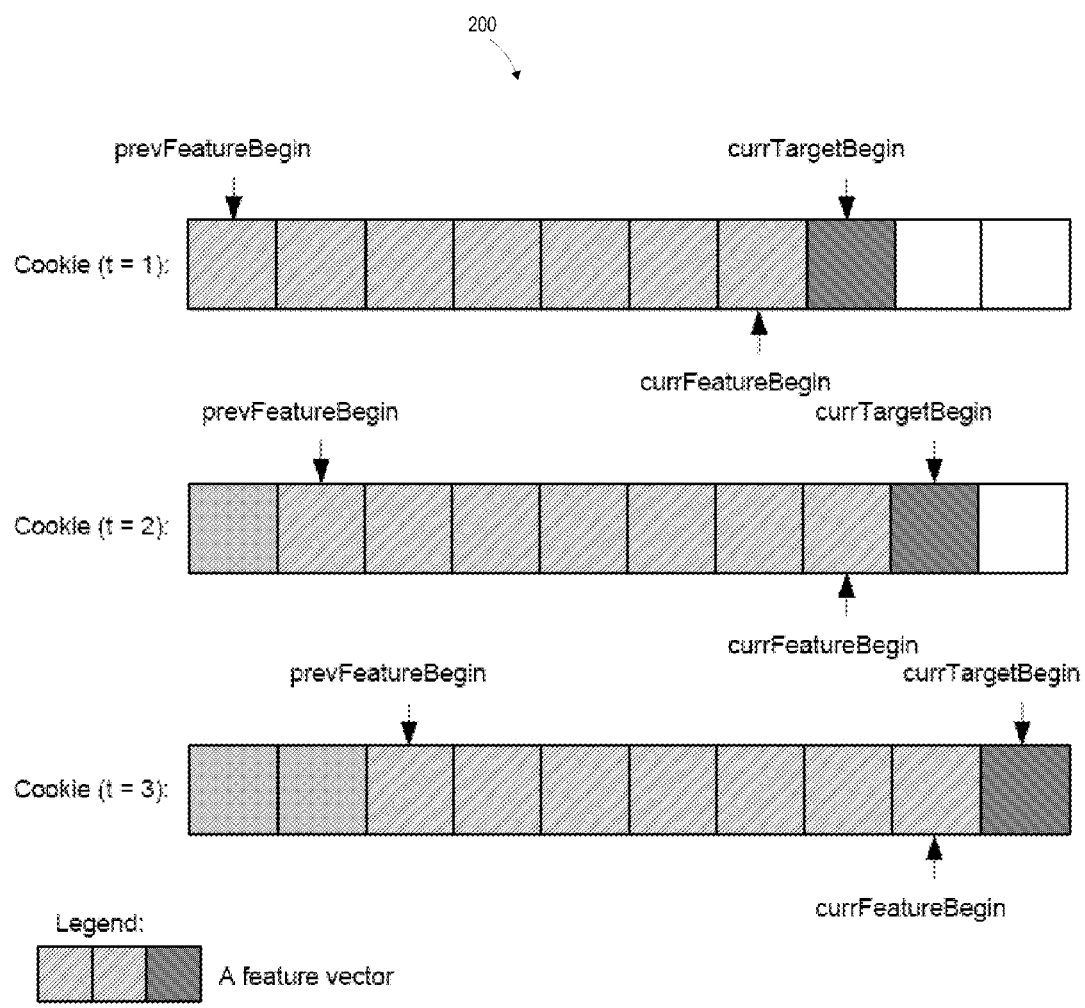
FIG. 2 is a schematic diagram illustrating the essence of a PoissonFeatureVector, in accordance with some embodiments.

FIG. 2 is a schematic diagram illustrating the essence of a PoissonFeatureVector, in accordance with some embodiments. Referring to FIG. 2 and Algorithm 4 above, the essence of the algorithm includes the following:

(1) For each cookie, the model training device 120 caches in memory all event counts data.

(2) The model training device 120 sorts events by time, and hence forms an event stream of this particular cookie covering the entire time period of interest. Notice that the sorting is in-memory and does not really process (e.g., parsing) the event data. Thus, the runtime is a negligible term in the analysis here.

(3) The model training device 120 pre-computes the boundaries of sliding windows. To generate an example, in particular, one needs to specify four boundaries: featureBegin, featureEnd, targetBegin, and targetEnd. Separating featureEnd and targetBegin is to allow a gap window in between, which is necessary to emulate possible latency in online prediction.

(4) The model training device 120 maintains three iterators on the event stream, referencing previous fetureBegin, current featureBegin and targetBegin, respectively. The model training device 120 uses one pair of TreeMap objects, i.e., inputMap and targetMap, to respectively hold the features and targets of a feature vector as the data is being processed. However, model training device 120 shares the object pair for all feature vectors. As the input and target windows slide forward, the model training device 120 advances the iterators accordingly to generate a feature vector for the current window using in-place increment, decrement, and decay. In the worst case, one scan of each of the three iterators is sufficient for generating all feature vectors of the cookie in question. In a typical causal setup, the target window is much smaller than the input window. Thus, the time complexity is approximately O(n).

Section 4.3: PoissonInitializer

The model training device 120 includes a PoissonInitializer that initializes the model weights (coefficients of regressors) by scanning the training data once. To exploit the sparseness of the problem, one shall use some data-driven approach instead of simply uniformly or randomly assigning weights to all parameters present in the weight matrix. A data-driven initialization will drastically speed up weights convergence since, for example, those weights with no data support will remain zeros as initialized. Let k be the index of target variables, j be the index of feature or input variables, and i denote examples. Further, a unigram(j) is one occurrence of feature j, and a bigram(k, j) is one co-occurrence of target k and feature j. The basic idea is to allocate the weight w(k, j) as a normalized number of co-occurrences of (k, j), i.e., a bigram-based initialization. Here normalization can be performed per example through its total feature counts, and globally through unigram and/or bigram counts. The system implements two weight initialization schemes: the first method uses feature-specific normalization by total feature unigram counts over all examples (the idea of tf-idf); the second method uses target-specific normalizer involving total unigram and bigram counts. See Algorithm 5 below for an example of initialization formulas.

---

Algorithm 5: PoissonInitializer

/* Indices: k for target, j for feature, i for example. */
/* Variables: y for target count, x for feature count, x for feature vector, w for weight, and w for weight vector. */
Input: ⟨cookieIndex, FeatureVector⟩
Output: initialized $w_k \forall k$
MapReduce 1: PoissonInitBigram;
Function: bigramKey(k, j)
begin
| return a long by bitwise-left-shift 32-bit k and bitwise-or j;
end
Function: cacheOutput(key, value)
begin
| if cachesize >= upperbound then
| | output and clear current cache;
| end
| cache and aggregate bigrams;
end
Mapper → ⟨bigramKey(k, j), $y_{ik}x_{ij}$⟩;
begin
| if initMethod = 1 then
| | $y_{ik} \leftarrow y_{ik} / \Sigma_{j'} x_{ij'}$;
| end
| cacheOutput (bigramKey (k, j), $y_{ik}x_{ij}$) $\forall$k, j;
end
Combiner: ValueAggregatorCombiner:
Reducer: ValueAggregatorReducer;
MapReduce 2: PoissonInitWeight;
Mapper: IdentityMapper;
Partitioner: by k (routing entries with a same target to a single reducer);
Reducer → $w_k$;
begin
| if initMethod = 1 then
| | $w_{kj} \leftarrow \dfrac{\Sigma_i (y_{ik}x_{ij}/\Sigma_{j'} x_{ij'})}{\Sigma_i x_{ij}}$;
| end
| else if initMethod = 2 then
| | $w_{kj} \leftarrow \dfrac{\Sigma_i (y_{ik}x_{ij}) \Sigma_i y_{ik}}{\Sigma_{j'} [\Sigma_i (y_{ik}x_{ij'}) \Sigma_i x_{ij'}]}$;
| end
end

---

The computational performance is dominated by counting bigrams, while the normalizing total unigram counts of features and targets are pre-computed in PoissonFeatureVector. The output of PoissonInitializer is an initialized weight matrix of dimensionality number of targets by number of features. To facilitate better task parallelism, the system represents the weight matrix as K weight vectors, each for a target variable k. In the final stage of initialization, the computation of the weight vector of a target variable k has to be carried out in a single node to output this weight vector. Notice that K can be arbitrarily small (e.g., one only wants to build a small number of BT-category models), and the traffic distribution over different targets (categories) is by nature highly skewed (e.g., "Finance" categories are generally popular, while some "Life Staging" categories are very rarely trafficked). Consequently, an unwise distributed design would not give optimal task parallelism and load balance; and hence make the final synchronization step a severe bottleneck. The algorithm here successfully addresses the above parallelization challenges by distributing the computation as follows:

(1) The model training device 120 distributes the computation of counting bigrams by a composite key <k, j>. Two naïve alternatives are distributing either k or j. Both, however, suffer from typically unbalanced traffics (some k or j dominate runtime) and the overhead of retrieving <k, j> bigrams from a <k> or <j> record. By distributing <k, j>, the algorithm yields an optimal parallelization independent of the characteristics of data and domain, with no application-level parallelization needed (a parallelization implemented on top of the MapReduce framework, e.g., randomly distributing a single key).

(2) The model training device 120 distributes composite keys <k, j> and effectively pre-computes total bigram counts of all examples before the final stage, thus making the last synchronization step as computationally light-weighted as possible. In some implementations, the would-be bottleneck step only takes minutes.

(3) Recall that MapReduce framework only provides a single key data structure (arguably for performance purpose). In order to distribute <k, j> keys, the model training device 120 needs an efficient function to transform a composite key (two integers) to two single keys and to recover the composite key back when needed (e.g., in the last step to synchronize the weight vector of a k). Specifically, the following operators are defined for this purpose: (a) bigramKey(k, j)=a long integer obtained by bitwise left-shift 32-bit of k and then bitwise OR by j; (b) k=an integer obtained from the high-order 32-bit of bigramKey(k, j); (c) j=an integer obtained from the low-order 32-bit of bigramKey(k, (4) The model training device 120 caches in-memory the output of the first Mapper that emits <bigramKey, bigramCount>, while aggregating bigram counts into a single bigram key for one cache. The size of the in-memory cache is configurable. This output caching reduces disk writes and network traffic, similar to the function of a Combiner, while leveraging data locality in memory proactively.

Section 4.4: PoissonMultiplicative

The model training device 120 includes a PoissonMultiplicative that updates the model weights by scanning the training data iteratively. The system utilizes a highly effective multiplicative recurrence. The update formula has a substantially identical form as the first initialization method of the PoissonInitializer of Section 4.3. However, the per-example normalizer becomes the expected target counts (Poisson means) instead of the total feature unigram counts. See Algorithm 6 below for an example of the update formula. To count bigrams (normalized), the algorithm here distributes composite keys <k, j> the same as PoissonInitializer. Computing a normalizer Poisson mean involves dot product a previous weight vector by a feature vector (the input portion).

---
Algorithm 6: PoissonMultiplicative
---

Input: ⟨cookieIndex, FeatureVector⟩
Output: updated $w_k \forall k$
MapReduce 1: PoissonMultBigram;
Function: processInputCache ( )

Figure 3:
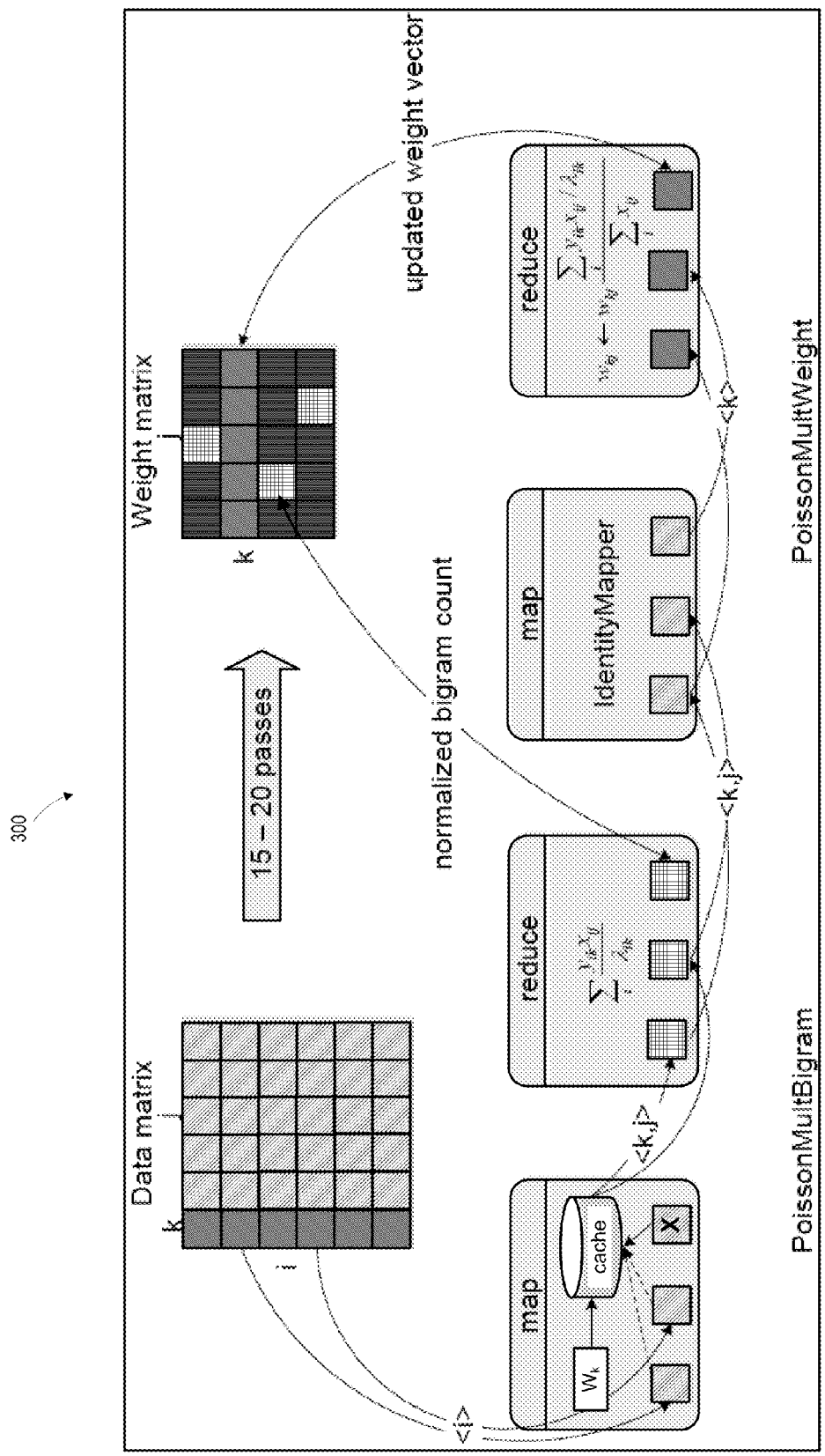
FIG. 3 is a schematic diagram illustrating a PoissonMultiplicative, in accordance with some embodiments.

---
Algorithm 6: PoissonMultiplicative
--- begin
  foreach k do
    read $w_k$;
    foreach $x_i \in$ input cache do
      $\lambda_{ik} \leftarrow w_k^T x_i$;
      $y_{ik} \leftarrow y_{ik}/\lambda_{ik}$;
      cacheOutput (bigramKey (k, j), $y_{ik}x_{ij}$) $\forall j$;
    end
  end
end
Function: cacheInput (value)
begin
  if inputcachesize >= upperbound then
    processInputCache ( );
    clear input cache;
  end
  cache bigrams and hash map of ⟨targetIndex, targetArrayIndex⟩;
  randomized feature/target partitioning if specified;
end Mapper → ⟨bigramKey(k, j), $y_{ik}x_i$⟩;
begin
  cacheInput(Feature Vector);
end
Combiner: ValueAggregatorCombiner:
Reducer: ValueAggregatorReducer;
MapReduce 2: PoissonMultWeight;
Mapper: IdentityMapper;
Partitioner: by k (routing entries with a same target to a single reducer);
Reducer → $w_k$;
begin
  $w_{kj} \leftarrow w_{kj} \frac{\sum_i (y_{ik}x_{ij}/\lambda_{ik})}{\sum_i x_{ij}}$;
  Lasso or Ridge regularization if specified;
end FIG. 3 is a schematic diagram illustrating a PoissonMultiplicative, in accordance with some embodiments. Referring to FIG. 3 and Algorithm 6, a highly scalable and efficient algorithm to accomplish the Poisson Multiplicative is as follows:

(1) The model training device 120 represents the model weight matrix as K dense weight vectors (arrays) of length J, where K is the number of targets (categories by click/view models) and J is the number of features. First, using weight vectors is more scalable in terms of memory footprint than matrix representation. Assume that K=500 and J=200,000, a float weight matrix requires 400 megabytes (MB) memory. Reading the entire matrix in memory, as one previous standalone implementation does, is inscalable in a Hadoop cluster of commodity computers. For example, in Yahoo's Hadoop clusters, each node has 8 gigabytes (GB) RAM which is typically shared by 8 JVM processes and hence 1 GB per JVM. The weight vector representation scales in both target and feature dimensions. A weight vector is read in memory on demand and once at a time; and hence K can be arbitrarily large. The memory footprint of a vector becomes bounded, e.g., a 200 MB RAM can hold a weight vector of 50 million features. A three-month worth of behavioral data without feature selection contains features well below 10 million. Second, the weight vector data structure facilitates task parallelism since a node only needs to retrieve those vectors relevant to the data being processed. Third, the dense representation makes dot product very efficient. Recall that feature vector uses sparse array data structure. Given a relevant weight vector read in memory, one loop of the feature vector sparse array is sufficient for computing the dot product. The dot-product of two sparse vectors is generally not efficient since random access is not in constant time as in a dense array. The choice of sparse representation for feature vector is readily justified by its much higher sparseness than weight vector.

(2) The dense weight vector representation is highly scalable, but raises challenges in disk IO (input-output). Consider a naïve implementation that reads weight vectors from disk on demand as it sequentially processes examples. Suppose there are n examples, k targets, and on average each feature vector contains c targets. File IO generally dominates the runtime of large-scale computing. In the worst case of c=k, the naïve algorithm thus has a complexity of O(kn), which obviously is of no use in practice. The model training device 120 handles this problem via, again, in-memory caching. Caching weight vectors is, however, not the solution; since a small subset of feature vectors will require all weight vectors sit in memory. The trick is to cache input examples. Now suppose there are m caches for the n feature vectors. After caching each cache, the algorithm maintains a hash map of <targetIndex, arrayIndex>. This hash map effectively records all relevant targets for the cached feature vectors, and meanwhile provides constant-time lookup from targetIndex to arrayIndex to retrieve target counts. In the worst case of all caches hitting k targets, the algorithm here yields a complexity of O(km), where m<<n. Caching input data is generally a very sound strategy for grid-based framework. For example, a Hadoop cluster of 2,000 nodes can distribute 256 GB data into 128 MB blocks with one node processing only one block. In some cases, for example, one month worth of training data gives 500 million feature vectors of a total size 250 GB; thus m=1 to 2 given a default block size of 128 MB.

(3) Other than in-memory caching, the model training device 120 extensively uses DistributedCache, a mechanism provided by the Hadoop MapReduce framework to distribute application-specific files. DistributedCache copies the requested files from the Hadoop Distributed File System (HDFS) to the slave nodes before tasks are executed. It only copies the files once per job for each task tracker (slave node) and are shared by the following map/reduce tasks. DistributedCache reduces HDFS file accesses to local. Suppose that 30,000 map tasks running on 200 nodes request a large HDFS file (a typical scenario). Using DistributedCache saves 30,000 HDFS accesses (potentially expensive network traffic) to 200; and the rest requests are shared locally. Moreover, DistributedCache alleviates the bottleneck of concurrent HDFS accesses. Further, DistributedCache is a solution, in many cases, to shifting data dependency from Network File System (NFS) to the more reliable HDFS. Candidates for DistributedCache are those files needed for computation but out of the MapReduce input/output framework. Here, weight vectors and unigram count vectors are two good examples of DistributedCache. Other metadata out of the MapReduce logic are also cached, such as ad-to-category mapping and hash maps (inverted indices) of entity dictionaries.

Section 5

Model Evaluation

Referring to FIG. 1, model evaluation in the model evaluation device 125 tests the trained model on a test dataset. Although this is an offline evaluation component, the goal is to access how the models will perform in production by emulating the online prediction setup as close as possible. The main tasks are predicting expected target counts (clicks and views), scoring (CTR), ranking scores of the test set, calculating and reporting performance metrics such as CTR lift and area under ROC curve. Specifically, this component contains three sequential steps: PoissonFeatureVectorEval, PoissonPredictor, and PoissonEvaluator.

Section 5.1: PoissonFeatureVectorEval

The model evaluation device 125 includes a PoissonFeatureVectorEval that is identical to the PoissonFeatureVector (Section 4.2) up to certain configurations to generate a test dataset as seen in online prediction. Referring to Algorithm 4 above, these configurations specific to test data generation include the following:

(1) There is no need to book keep the summary statistics for training such as total counts of examples, feature and target unigrams.

(2) Decay is typically necessary in generating test data; since it enables efficient incremental predicting as new events flows in while diminishing the obsolete long history exponentially (in an exponential decay as used here). It has been found empirically that a decay rate equivalent to 14-day half-life yields superior long-term model results.

(3) Sampling (random or stratified) and heuristic-based robot filtering are usually not applied in generating test data, since the model should be evaluated on an unbiased sample population.

(4) One can remove those examples without targets from the test dataset, since these records will not impact the performance no matter how the model predicts them. However, any examples with targets must be kept even if without any inputs. This is because these records ("new users") will have to be scored by the model in production, and hence have a non-trivial impact on the performance. Also notice that the volume of these zero-input non-zero-target examples can be significant (e.g., about 20% new users in a test set).

(5) In training, one can categorize target counts either from the entire feature space or from the selected space, depending on the learning goal. In testing, however, one shall aggregate target counts from the entire feature space since this is the way the current production environment evaluates model performance.

(6) Finally, the size of the sliding target window is configured approximately same as the ad serving cycle in production; and the size of the gap window shall imitate the latency between last seen events and next ad serving in production. The current configuration is 6-minute window for both gap and target.

Section 5.2: PoissonPredictor

The model evaluation device 125 includes a PoissonPredictor that takes the dot product of a weight vector and a feature vector as the predicted target count (a continuous variable). To predict the expected numbers of ad clicks and views in all categories for an example i, the algorithm needs to read the weight vectors of all targets converged from the PoissonMultiplicative. The model evaluation device 125 therefore applies the same in-memory caching trick as in the PoissonMultiplicative to scale disk IO. See Algorithm 7 below for an example of a PoissonPredictor.

---
Algorithm 7: PoissonPredictor
---

Input: ⟨cookieIndex, FeatureVector⟩

Output: ⟨cookieIndex, predictedActualTarget[2 × numTarget]⟩
MapReduce 1: PoissonPredictor:
Function: processInputCache ( )
begin
   initialize predictedActualTarget[i][2 × numTarget] ∀i ∈ input cache;
   /* Predicted */
   foreach k do
      read $w_k$;
      foreach i ∈ input cache do
         $\lambda_{ik} \leftarrow w_k^T x_i$;
         predictedActualTarget[i][k] ← $\lambda_{ik}$;
      end
   end
   /* Actual */
   foreach i ∈ input cache do
      predictedActualTarget[i][numTarget+k] ← $y_{ik}$;
      bookkeeping reducer-local target unigrams;
   end
   /* Output */
   foreach i ∈ input cache do
      output ⟨cookieIndex, predictedActualTarget[i][2 × numTarget]⟩;
   end
end
Function: cacheInput(key, value)
begin
   if inputcachesize >= upperbound then
      processInputCache ( );
      clear input cache;
   end
   cache cookieIndex and FeatureVector;
end
Mapper: IdentityMapper;

Reducer → ⟨cookieIndex, predictedActualTarget[2 × numTarget]⟩;
begin
| cacheInput(cookieIndex, FeatureVector);
end
MapReduce 2: PoissonPredTargetUnigram;
Mapper: IdentityMapper;
Reducer: reducer-local target unigram counts → global target unigram counts;

Section 5.3: PoissonEvaluator

The model evaluation device 125 includes a PoissonEvaluator that scores each testing example by dividing its predicted clicks by predicted views and applying Laplacian smoothing; then sorts all examples by score; and finally computes and reports performance metrics. The performance metrics include number of winning categories over certain benchmark, cumulative CTR, CTR lift, area under ROC curve (AUC), and summary statistics. The model evaluation device 125 generates reports of both per-category results and overall performance. See Algorithm 8 below for an example of a PoissonEvaluator.

---
Algorithm 8: PoissonEvaluator
---

Input: ⟨cookieIndex, predictedActualTarget[2 × numTarget]⟩
Output: performance metrics, per-category and overall reports.
MapReduce 1: PoissonEvaluator;

Mapper → ⟨score, catActuals[3]⟩;

---
Algorithm 8: PoissonEvaluator
--- begin
   foreach category do
      score ← predicted click / predicted views;
      apply Laplacian smoothing globally or per-category using training population CTR as specified;
      catActuals[1] ← category;
      catActuals[2] ← actual clicks;
      catActuals[3] ← actual views;
      output ⟨score, catActuals[3]⟩;
   end
end
Partitioner: by category (routing entries with a same category to a single reducer);
Comparator: sort score float in reverse order;

Reducer → ⟨score, performanceMetrics⟩;
begin
   scan the reversely sorted score file once to compute performance metrics;
   generate per-category reports of summary statistics, ROC area, CTR and lift, etc.;
end
generate summary (over all categories) report of summary statistics, ROC area, CTR and lift, etc.;

Section 6

Method Overview

Figure 4:
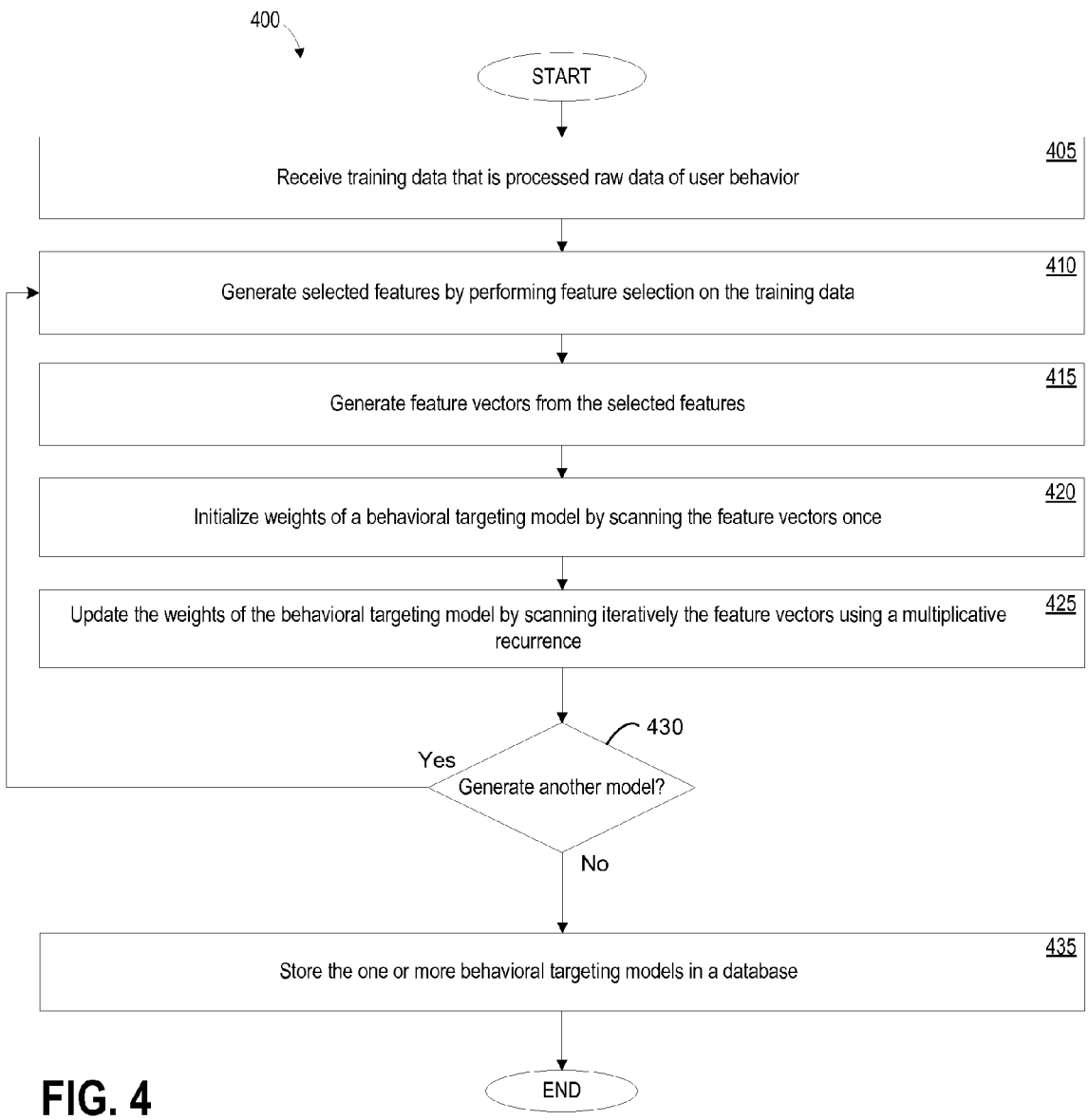
FIG. 4 is a flowchart of a method for large-scale behavioral targeting, in accordance with some embodiments.

FIG. 4 is a flowchart of a method 400 for large-scale behavioral targeting, in accordance with some embodiments. The steps of the method 400 may be carried out by the model training device 120 of FIG. 1. The method 400 starts in a step 405 where the system receives training data. The method 400 then moves to a step 410 where the system generates selected features by performing feature selection on the training data. Next, in a step 415, the system generates feature vectors from the selected features. The method then proceeds to a step 420 where the system initializes weights of a behavioral targeting model by scanning the feature vectors once. Then, in a step 425, the system updates the weights of the behavioral targeting model by scanning iteratively the feature vectors using a multiplicative recurrence.

Next, in decision operation 430, the system determines if another model is to be generated. If another model is to be generated, the method returns to the step 410 where the system generates selected features. However, if another model is not be generated, then the method proceeds to a step 435 where the system stores one or more behavioral targeting models in a database or a database system (e.g., an HDFS). The method 400 then concludes.

Note that the method may include other details and steps that are not discussed in this method overview. For example, the method may include steps carried out by the data preparation device 115 and the model evaluation device 125 of FIG. 1. Other details and steps are discussed above with reference to the appropriate figures and may be a part of the present method, depending on the embodiment.

Section 7

Computer Readable Medium Implementation

Portions of the invention may be conveniently implemented by using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. Some embodiments may also be implemented by the preparation of application-specific integrated circuits or by interconnecting an appropriate network of conventional component circuits, as will be readily apparent to those skilled in the art.

Some embodiments may include a computer program product which is a storage medium (media) having instructions stored thereon/in which can be used to control, or cause, a computer to perform any of the processes of the invention. The storage medium can include without limitation any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), some implementations include software for controlling both the hardware of the general purpose/specialized computer or microprocessor, and for enabling the computer or microprocessor to interact with a human user or other mechanism utilizing the results of the invention. Such software may include without limitation device drivers, operating systems, and user applications. Ultimately, such computer readable media further includes software for performing aspects of the invention, as described above.

Included in the programming (software) of the general/specialized computer or microprocessor are software modules for implementing the teachings of the invention, including without limitation receiving training data that is processed raw data of user behavior, generating selected features by performing feature selection on the training data, generating feature vectors from the selected features, initializing weights of a behavioral targeting model by scanning the feature vectors once, and updating the weights of the behavioral targeting model by scanning iteratively the feature vectors using a multiplicative recurrence, according to the processes described above.

Section 8

Advantages

Embodiments of the invention successfully address BT challenges through a truly scalable, efficient and flexible design and implementation. Embodiments of the invention are a truly scalable, efficient and flexible solution to BT for several reasons discussed below.

The system is configured to build BT models from an entire user base of user data (e.g., Yahoo!® user data) for over 450 BT categories, within less than one day. A conventional standalone modeling system typically can only manage to train 60 BT-category direct-response models using about one week end-to-end time.

The model performance increases significantly by enjoying substantially large data. For example, in one recent experiment to benchmark the system with the existing system, the number of winning categories at operating point increases from 23 to 28 out of a total 60, and the average CTR lift improves from 14.7% to 20.7%, with runtime drastically reduced.

The system further enables the potential of frequent model refreshes. The system also enables the potential of short-term modeling.

The system streamlines the workflow via a fully-automated seamless modeling framework. Such modeling reduces engineer resources from as much three to one, in some cases.

The system is flexible and configurable enough to incorporate new data sources with minimum development effort, thereby enabling the potential of strategic data partnership with various companies (e.g., eBay, Forbes, Wal-Mart, etc.). The system is also flexible and configurable enough to incorporate and experiment with new ideas such as segmentation and leveraging real-time content data.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for large-scale behavioral targeting, the method comprising:
receiving, using a computer processor, training data that is processed raw data of user behavior;
generating, using a computer processor, selected features by performing feature selection on the training data;
generating, using a computer processor, feature vectors from the selected features;
initializing, using a computer processor, weights of a behavioral targeting model, wherein the behavioral targeting model is based on a Poisson regression, by:
scanning the feature vectors once,
allocating each of the weights as a normalized co-occurrence of a target and a feature,
generating a weight matrix whose dimensionality is a total number of targets by a total number of features,
generating a plurality of weight vectors for each of the selected features from the weight matrix; and
updating, using a computer processor, the weight vectors of the behavioral targeting model by scanning iteratively the feature vectors using a multiplicative recurrence.

2. The method of claim 1, wherein the training data includes at least one of:
reduced data from raw data of user behavior;
aggregated data from raw data of user behavior; and
merged data from raw data of user behavior.

3. The method of claim 1, further comprising storing one or more behavioral targeting models in a Hadoop Distributed File System.

4. The method of claim 1, wherein the performing feature selection on the training data comprises at least one of:
counting frequencies of entities in terms of touching cookies; and
selecting most frequent entities of the entities in a given feature space.

5. The method of claim 1, wherein the generating feature vectors comprises at least one of:
configuring the feature vectors to represent the selected features;
optimizing the feature vectors for sequential access along both a user dimension and a feature dimension; and
materializing any data reduction and pre-computing opportunities.

6. The method of claim 5, wherein the generating feature vectors comprises at least one of:

configuring each of the feature vectors to be a sparse data structure;

referencing an original feature by an index of an inverted index; and configuring the features vectors using binary representation and data compression.

7. The method of claim 1, further comprising at least one of:

distributing a computation of counting bigrams by a composite key; and caching in-memory an output the computation, wherein a size of an in-memory cache is configurable.

8. A system, comprising a computer processor and a memory, for large-scale behavioral targeting, wherein the computer processor is configured to perform the steps of:

receiving training data that is processed raw data of user behavior;

generating selected features by performing feature selection on the training data;

generating feature vectors from the selected features;

initializing weights of a behavioral targeting model, wherein the behavioral targeting model is based on a Poisson regression, by:

scanning the feature vectors once, allocating each of the weights as a normalized co-occurrence of a target and a feature, generating a weight matrix whose dimensionality is a total number of targets by a total number of features, generating a plurality of weight vectors for each of the selected features from the weight matrix; and updating the weight vectors of the behavioral targeting model by scanning iteratively the feature vectors using a multiplicative recurrence.

9. The system of claim 8, wherein the training data includes at least one of:

reduced data from raw data of user behavior;

aggregated data from raw data of user behavior; and merged data from raw data of user behavior.

10. The system of claim 8, wherein the system is further configured for storing one or more behavioral targeting models in a Hadoop Distributed File System.

11. The system of claim 8, wherein the performing feature selection on the training data comprises at least one of:

counting frequencies of entities in terms of touching cookies; and selecting most frequent entities of the entities in a given feature space.

12. The system of claim 8, wherein the generating feature vectors comprises at least one of:

configuring the feature vectors to represent the selected features;

optimizing the feature vectors for sequential access along both a user dimension and a feature dimension; and materializing any data reduction and pre-computing opportunities.

13. The system of claim 12, wherein the generating feature vectors comprises at least one of:

configuring each of the feature vectors to be a sparse data structure;

referencing an original feature by an index of an inverted index; and configuring the features vectors using binary representation and data compression.

14. The system of claim 8, wherein the system is further configured for at least one of:

distributing a computation of counting bigrams by a composite key; and caching in-memory an output the computation, wherein a size of an in-memory cache is configurable.

15. A non-transitory computer readable medium carrying one or more instructions for large-scale behavioral targeting, wherein the one or more instructions, when executed by one or more processors, cause the one or more processors to perform the steps of:

receiving training data that is processed raw data of user behavior;

generating selected features by performing feature selection on the training data;

generating feature vectors from the selected features;

initializing weights of a behavioral targeting model, wherein the behavioral targeting model is based on a Poisson regression, by:

scanning the feature vectors once, allocating each of the weights as a normalized co-occurrence of a target and a feature, generating a weight matrix whose dimensionality is a total number of targets by a total number of features, generating a plurality of weight vectors for each of the selected features from the weight matrix; and updating the weight vectors of the behavioral targeting model by scanning iteratively the feature vectors using a multiplicative recurrence.

* * * * *